United States Patent
Shao et al.

(10) Patent No.: US 12,190,696 B2
(45) Date of Patent: Jan. 7, 2025

(54) METHODS FOR INDOOR GAS LEAKAGE DISPOSAL OF SMART GAS AND INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Bin Liu, Chengdu (CN); Xiaojun Wei, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 24 days.

(21) Appl. No.: 18/446,461

(22) Filed: Aug. 8, 2023

(65) Prior Publication Data

US 2023/0386314 A1  Nov. 30, 2023

Related U.S. Application Data

(63) Continuation of application No. 18/052,929, filed on Nov. 6, 2022, now Pat. No. 11,854,360.

(30) Foreign Application Priority Data

Oct. 20, 2022  (CN) .......................... 202211283273.2

(51) Int. Cl.
  *G08B 17/10*   (2006.01)
  *G16Y 20/10*   (2020.01)
(52) U.S. Cl.
  CPC .............. *G08B 17/10* (2013.01); *G16Y 20/10* (2020.01)

(58) Field of Classification Search
  CPC ........ G08B 17/10; G16Y 20/10; G16Y 10/35; G16Y 20/20; G16Y 30/10; G16Y 40/10;
  (Continued)

(56) References Cited

U.S. PATENT DOCUMENTS

2014/0061962 A1* 3/2014 Lane ..................... B29C 70/54
                                                     264/40.3
2017/0193790 A1  7/2017 Cornwall
(Continued)

FOREIGN PATENT DOCUMENTS

CN      206179178 U    5/2017
CN      108898803 A   11/2018
(Continued)

OTHER PUBLICATIONS

Zhao, Yanming et al., Research on Intelligent Alarm System of Household Gas Leakage, Control and Instruments in Chemical Industry, 2021, 6 Pages.
(Continued)

*Primary Examiner* — Naomi J Small
(74) *Attorney, Agent, or Firm* — METIS IP LLC

(57) ABSTRACT

The present disclosure provides a method for indoor gas leakage disposal of smart gas and an Internet of Things system. The method is implemented by a smart gas indoor safety management sub platform. The method includes obtaining monitoring information and user description information from a smart gas data center, the monitoring information including alarm information and gas terminal monitoring data, the monitoring information being obtained from a smart gas object platform through a smart gas sensor network platform, the user description information including user-defined alarm information uploaded by a user, and the user description information being obtained from a smart gas user platform through a smart gas service platform;
(Continued)

determining a cause of gas leakage based on the monitoring information and the user description information; and determining a plurality of candidate solutions based on the cause of gas leakage.

20 Claims, 5 Drawing Sheets

(58) Field of Classification Search
CPC .......... G16Y 40/50; Y02P 90/02; G01M 3/26; G05B 19/048; G06N 3/08; G06Q 10/04; G06Q 50/265
USPC ........................................................ 340/632
See application file for complete search history.

(56) References Cited

U.S. PATENT DOCUMENTS

| | | | |
|---|---|---|---|
| 2019/0270349 A1* | 9/2019 | Larsen | B60C 23/041 |
| 2019/0302719 A1* | 10/2019 | Aljuaid | G08B 21/182 |
| 2021/0191385 A1* | 6/2021 | Ahmad | G01N 33/0075 |
| 2021/0216852 A1* | 7/2021 | Reece | G08B 29/20 |
| 2022/0057048 A1* | 2/2022 | Geuens | F15B 20/005 |

FOREIGN PATENT DOCUMENTS

| | | |
|---|---|---|
| CN | 111862542 A | 10/2020 |
| CN | 112785821 A | 5/2021 |
| CN | 113395299 A | 9/2021 |
| CN | 113534705 A | 10/2021 |
| CN | 114542988 A | 5/2022 |
| JP | 2008269439 A | 11/2008 |
| JP | 2017152886 A | 8/2017 |
| WO | 2018137058 A1 | 8/2018 |
| WO | 2018137068 A1 | 8/2018 |
| WO | 2019190834 A1 | 10/2019 |

OTHER PUBLICATIONS

Cui, Shuang et al., Construction of Smart Community Gas System, Gas & Heat, 2021, 4 pages.
Shao, Zehua et al., IoT Smart Gas Meter Gas Abnormal State Perception and Control, Gas & Heat, 2020, 6 pages.
First Office Action in Chinese Application No. 202211283273.2 mailed on Nov. 24, 2022, 12 pages.

* cited by examiner

METHODS FOR INDOOR GAS LEAKAGE DISPOSAL OF SMART GAS AND INTERNET OF THINGS SYSTEMS THEREOF

CROSS-REFERENCE TO RELATED APPLICATIONS

This application is a continuation of U.S. application Ser. No. 18/052,929, filed on Nov. 6, 2022, which claims priority to Chinese Patent Application No. 202211283273.2, filed on Oct. 20, 2022, the contents of which may be hereby incorporated by reference to its entirety.

TECHNICAL FIELD

The present disclosure generally relates to the field of smart gas, and in particular, to methods for indoor gas leakage disposal of smart gas and Internet of Things systems thereof.

BACKGROUND

The gas system is a commonly used indoor energy supply system, such as supplying fuel to water heaters, stoves, etc. However, with a wide application of the gas system, a count of gas accidents is also increasing, especially the gas accidents caused by gas leakage. As the gas is flammable, explosive, easy to flow and diffuse, it is very easy to explode and fire in case of open fire or electric spark once leakage occurs.

In view of this, it is hoped to provide a method for indoor gas leakage disposal of smart gas and an Internet of Things system, which can automatically determine the cause of gas leakage, and provide solutions while improving the troubleshooting efficiency of gas leakage causes.

SUMMARY

One or more embodiments of the present disclosure provide a method for indoor gas leakage disposal of smart gas. The method is implemented by a smart gas indoor safety management sub platform. The method includes: obtaining monitoring information and user description information from a smart gas data center, the monitoring information including alarm information and gas terminal monitoring data, the monitoring information being obtained from a smart gas object platform through a smart gas sensor network platform by the smart gas data center, the user description information including user-defined alarm information uploaded by a user, and the user description information being obtained from a smart gas user platform through a smart gas service platform by the smart gas data center; determining a cause of gas leakage based on the monitoring information and the user description information; determining a plurality of candidate solutions based on the cause of gas leakage, including: determining a feature vector based on the monitoring information, the user description information, a probability of misreporting, and the cause of gas leakage, wherein the probability of misreporting is determined based on a misreporting probability determination model, and the misreporting probability determination model is a machine learning model; and determining the plurality of candidate solutions based on a similarity between the feature vector and a reference vector in a database, wherein the database includes a plurality of the reference vectors and candidate solutions corresponding to the plurality of reference vectors; and determining an effective solution rate of the candidate solutions, and determining a target solution among the candidate solutions according to the effective solution rate.

One or more embodiments of the present disclosure provide an Internet of Things system for indoor gas leakage disposal of smart gas. The Internet of Things system includes a smart gas user platform, a smart gas service platform, a smart gas safety management platform, a smart gas sensor network platform, and a smart gas object platform. The smart gas safety management platform includes a smart gas indoor safety management sub platform and a smart gas data center. The smart gas indoor safety management sub platform is configured to perform operations including: obtaining monitoring information and user description information from a smart gas data center, the monitoring information including alarm information and gas terminal monitoring data, the monitoring information being obtained from a smart gas object platform through a smart gas sensor network platform by the smart gas data center, the user description information including user-defined alarm information uploaded by a user, and the user description information being obtained from a smart gas user platform through a smart gas service platform by the smart gas data center; determining a cause of gas leakage based on the monitoring information and the user description information; determining a plurality of candidate solutions based on the cause of gas leakage, including: determining a feature vector based on the monitoring information, the user description information, a probability of misreporting, and the cause of gas leakage, wherein the probability of misreporting is determined based on a misreporting probability determination model, and the misreporting probability determination model is a machine learning model; and determining the plurality of candidate solutions based on a similarity between the feature vector and a reference vector in a database, wherein the database includes a plurality of the reference vectors and candidate solutions corresponding to the plurality of reference vectors; and determining an effective solution rate of the candidate solutions, and determining a target solution among the candidate solutions according to the effective solution rate.

One or more embodiments of the present disclosure provide a non-transitory computer-readable storage medium storing computer instructions, when the computer reads the computer instructions in the storage medium, the computer executes the method for indoor gas leakage disposal of smart gas.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein.

DETAILED DESCRIPTION

Figure 1:
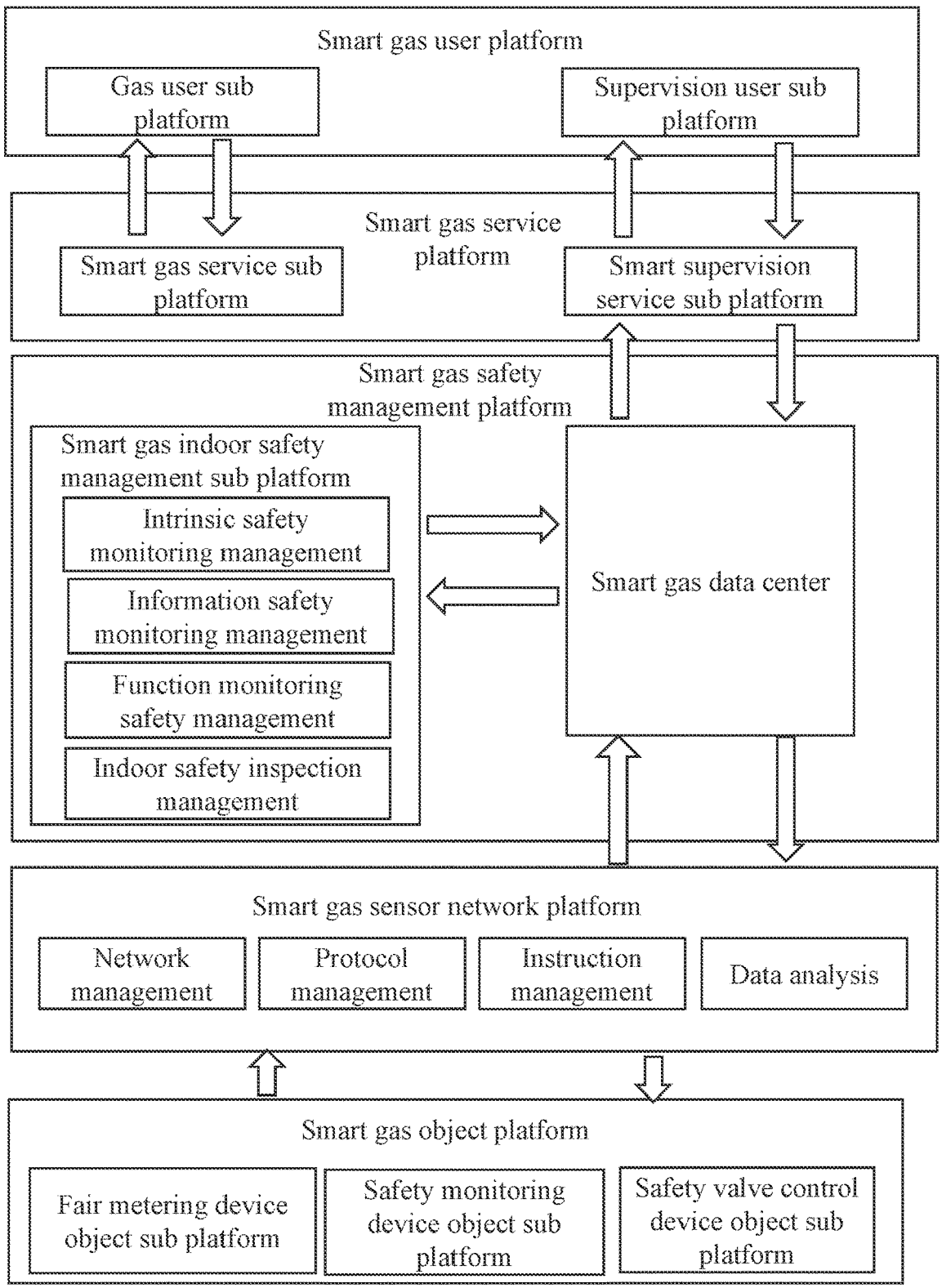
FIG. 1 is an exemplary schematic diagram of a structure of an Internet of Things system of smart gas terminal linkage disposal according to some embodiments of the present disclosure.

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the drawing represents the same structure or operation.

It should be understood that the "system", "device", "unit" and/or "module" used herein is a method for distinguishing different components, elements, parts or assemblies at different levels. However, if other words can achieve the same purpose, they can be replaced by other expressions.

As shown in the description and the claims, unless the context expressly indicates exceptions, the words "a", "an", "the", "one", and/or "this" do not specifically refer to the singular, but may also include the plural; and the plural forms may be intended to include the singular forms as well, unless the context clearly indicates otherwise. Generally speaking, the terms "include" only indicate that the steps and elements that have been clearly identified are included, and these steps and elements do not constitute an exclusive list. Methods or equipment may also include other steps or elements.

A flowchart is used in this disclosure to explain the operation performed by the system according to the embodiment of the present disclosure. It should be understood that the previous or subsequent operations are not necessarily performed accurately in order. Instead, the steps may be processed in reverse order or simultaneously. At the same time, you can add other operations to these processes, or remove one or more steps from these processes.

FIG. 1 is an exemplary schematic diagram of an Internet of Things structure of a system of smart gas terminal linkage disposal according to some embodiments of the present disclosure.

It should be understood that a system of smart gas terminal linkage disposal 100 may be realized in various ways. As shown in FIG. 1, the system of smart gas terminal linkage disposal may include a smart gas user platform 110, a smart gas service platform 120, a smart gas safety management platform 130, a smart gas sensor network platform 140 and a smart gas object platform 150.

The smart gas user platform 110 may be a user-oriented platform that interacts with users, which may be configured as a terminal device for feeding back abnormal gas information and corresponding solutions to users. As used herein, the abnormal gas information may at least include monitoring information for the gas system and user-defined alarm information uploaded by users.

In some embodiments, the smart gas user platform 110 may include a gas user sub platform and a supervision user sub platform. The gas user sub platform may be a sub platform for a gas user, which may correspond to and interact with a smart gas service sub platform to provide the gas user with gas related data and gas problem solutions. The supervision user sub platform may be a sub platform for supervision users. Through the supervision user sub platform, the supervision users may supervise an operation of the entire Internet of Things system.

In some embodiments, the smart gas user platform may interact with a smart gas service sub platform of the smart gas service platform 120. For example, the smart gas user platform 110 may send an indoor gas safety information query instruction to the smart gas service platform 120. As another example, the smart gas user platform 110 may receive the indoor gas safety information uploaded by the smart gas service platform 120. The indoor gas safety information may include abnormal gas information (such as gas leakage) and corresponding solutions. Specifically, the supervision users may send a query instruction to a smart supervision service sub platform through the supervision user sub platform to obtain the gas safety situation in the relevant jurisdictions of the smart supervision service sub platform; and the gas user may obtain safety reminder information from the smart gas service sub platform through the gas user sub platform.

The smart gas service platform 120 may be a platform to provide users with safe gas use and safety supervision services.

In some embodiments, the smart gas service platform 120 may include the smart gas service sub platform and the smart supervision service sub platform. The smart gas service sub platform may correspond to the gas user sub platform to provide safe gas service for the gas user. The smart supervision service sub platform may correspond to the supervision user sub platform to provide safety supervision services for the supervision users.

In some embodiments, the smart gas service platform 120 may perform data interaction with the smart gas user platform 110 and the smart gas safety management platform 130. For example, the smart gas service platform 120 may send an indoor gas safety information query instruction to the smart gas safety management platform 130 and receive the indoor gas safety information uploaded by the smart gas safety management platform 130. As another example, the smart gas service platform may receive the indoor gas safety information query instruction issued by the smart gas user platform 110 and upload the indoor gas safety information from the smart gas safety management platform 130.

The smart gas safety management platform 130 may refer to a platform that overall plans and coordinates the connection and cooperation among various functional platforms, and gathers all data and information of the system of smart city gas terminal linkage disposal 100. The smart gas safety management platform may provide data management, control management, data analysis and other functions for the operation of the system of smart gas terminal linkage disposal 100.

In some embodiments, the smart gas safety management platform may be a remote platform controlled by a manager, artificial intelligence, or preset rules.

In some embodiments, the smart gas safety management platform 130 may include a smart gas data center and at least one smart gas indoor safety management sub platform. Each smart gas indoor safety management sub platform may correspond to the gas system used by one user. As used herein, the smart gas indoor safety management sub platform may interact with the smart gas data center in a two-way way. The smart gas indoor safety management sub platform may obtain and return the safety management data of indoor gas terminal device from the smart gas data center.

The smart gas data center may summarize and store all operation data of the system of smart gas terminal linkage disposal 100.

In some embodiments, the smart gas indoor safety management sub platform may include at least one safety management module. As used herein, the at least one safety management module may include an intrinsic safety monitoring management module, an information safety monitoring management module, and a function monitoring management module. The intrinsic safety monitoring management module may monitor the data of mechanical leakage, electrical power consumption (smart control power consumption, communication power consumption), valve control and other explosion-proof safety aspects. The information security monitoring management module may monitor data exceptions, illegal equipment information, illegal access, etc. The functional monitoring management includes monitoring functional security such as long-term unused, continuous flow timeout, flow overload, abnormal large flow, abnormal small flow, low air pressure, strong magnetic interference, and low voltage. The function monitoring management module may monitor the functional safety such as long-term unused, continuous flow timeout, flow overload, abnormal large flow, abnormal small flow, low air pressure, strong magnetic interference, and low voltage.

In some embodiments, the smart gas data center may send obtained safety data to the corresponding safety management module by identifying a safety parameter category. Each safety management module may have a preset safety threshold. When the safety data exceeds the safety threshold, the smart gas safety management platform may automatically send an alarm, and may choose to automatically push the alarm information to the gas user and/or supervision user.

In some embodiments, the smart gas safety management platform 130 may interact with the smart gas sensor network platform 140 and the smart gas service platform 130. For example, the smart gas safety management platform 130 may send an instruction on data related to indoor gas safety to the smart gas sensor network platform 140, and receive the data related to indoor gas safety uploaded by the smart gas sensor network platform 140. As another example, the smart gas safety management platform 140 may receive a query instruction on the data related to indoor gas safety issued by the smart gas service platform 120, and upload the data related to indoor gas safety to the smart gas service platform 120.

In some embodiments, data interactions between the smart gas safety management platform 130 and the smart gas service platform 120 and the smart gas sensor network platform 140 may be conducted through the smart gas data center. For example, the smart gas data center may receive a query instruction of abnormal indoor gas information issued by the smart gas service platform 120. The smart gas data center may send an instruction on obtaining the data related to abnormal indoor gas to the smart gas sensor network platform 140. The smart gas data center may send the data related to abnormal indoor gas from the smart gas sensor network platform 140 to the smart gas safety management sub platform for analysis and processing. The smart gas indoor safety management sub platform may send processed data to the smart gas data center. The smart gas data center may send the summarized and processed data (such as a cause of gas anomaly and corresponding solutions) to the smart gas service platform 120.

In some embodiments, the smart gas safety management platform 130 may be configured to determine the cause of gas leakage based on the monitoring information of the gas system and user description information, and further determine a target solution based on the cause of gas leakage. For more information on determining the cause of gas leakage and the target solution, refer to FIG. 2 to FIG. 5 of the present disclosure and their related descriptions.

The smart gas sensor network platform 140 may be a function platform for managing sensor communication, and may be configured as a communication network and gateway.

In some embodiments, the smart gas sensor network platform 140 may include at least one smart gas sensor network sub platform. The at least one smart gas sensor network sub platform may include different sub platforms such as network management, protocol management, instruction management and data analysis, which may be configured to manage networks, protocols and instructions and analyze relevant data. A smart gas sensor network sub platform may correspond to a gas system used by the user and a smart gas safety management sub platform of the smart gas safety management platform 130. For example, the smart gas sensor network sub platform may transmit the monitoring data of an indoor gas system corresponding to the user obtained through the object platform 150 to the corresponding smart gas safety management sub platform.

In some embodiments, the smart gas sensor network platform 140 may interact with the smart gas safety management platform 130 and the smart gas object platform 150 to realize functions of sensing communication of perceptual information and control information. For example, the smart gas sensor network platform 140 may send an instruction for obtaining monitoring data of indoor gas system to the smart gas object platform 150, and receive monitoring data of the indoor gas system uploaded by the smart gas object platform 150. As another example, the smart gas sensor network platform 140 may receive the instruction for obtaining the monitoring data of the indoor gas system sent by the smart gas data center of the smart gas safety management platform 130, and upload the monitoring data of the indoor gas system to the smart gas data center.

The smart gas object platform 150 may be a function platform for sensing information generation and may be configured as various devices, such as indoor gas equipment, safety detection equipment, etc. In some embodiments, the smart gas object platform may obtain information. For example, the smart gas object platform may obtain the monitoring information of the gas system of the user.

In some embodiments, the smart gas object platform 150 may obtain information related to gas safety through at least one sub platform of the smart gas object platform 150. The at least one sub platform may include fair metering device object sub platform, safety monitoring device object sub platform and safety valve control device object sub platform. The safety monitoring device object sub platform may be configured as a gas concentration detection device for detecting whether the gas leakage occurs.

In some embodiments, the smart gas object platform 150 may interact with the smart gas sensor network platform 140. For example, the smart gas object platform 150 may receive the instruction for obtaining the data related to gas safety sent by the smart gas sensor network platform 140, and upload data related to indoor gas safety to the smart gas sensor network platform 140.

It should be noted that the above description of the system of smart gas terminal linkage disposal and different platforms is only for the convenience of description, and cannot limit the present disclosure to the scope of the embodiments.

It can be understood that for those skilled in the art, after understanding the principle of the system, they may arbitrarily combine various modules or form a subsystem to connect with other modules without departing from this principle. For example, the smart gas safety management platform, smart gas user platform, smart gas service platform, smart gas sensor network platform and smart gas object platform disclosed in FIG. 1 may be different platforms in a system, and may also be same platforms in a system.

Figure 2:
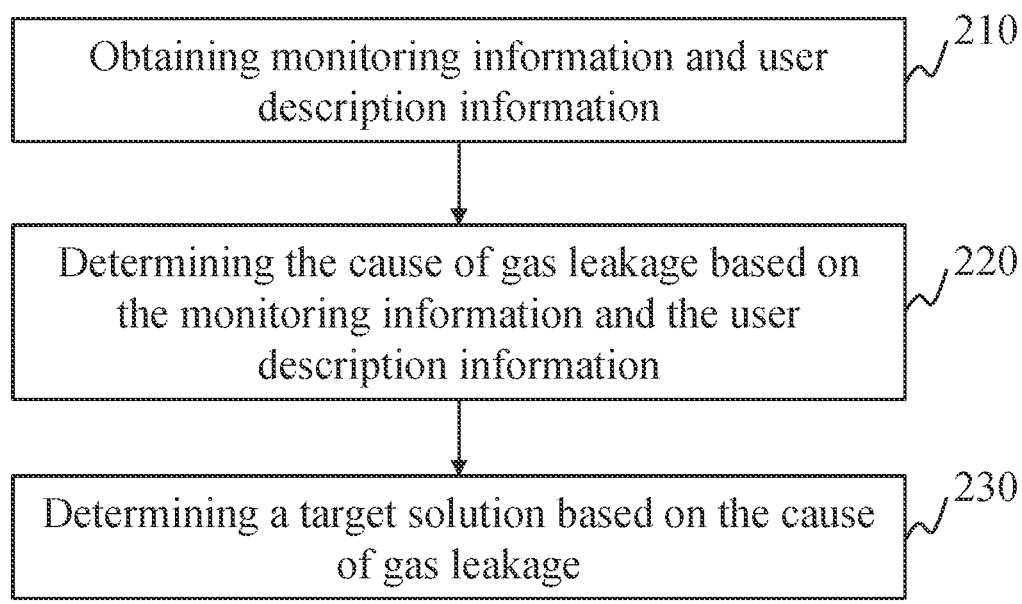
FIG. 2 is an exemplary flowchart of a method of smart gas terminal linkage disposal according to some embodiments of the present disclosure.

FIG. 2 is an exemplary flowchart of a method of smart gas terminal linkage disposal according to some embodiments of the present disclosure. As shown in FIG. 2, the process 200 may include following operations. In some embodiments, the process 200 may be executed by the smart gas safety management platform 130.

In step 210, obtaining monitoring information and user description information.

The monitoring information may refer to the monitoring information of the gas system, which may include information related to status of the gas system that is monitored and recorded in real time by the gas system. In some embodiments, the monitoring information of the gas system may include alarm information, gas terminal monitoring data, etc.

The alarm information may refer to alarm information related to abnormal conditions of the gas system. For example, the alarm information may include high gas concentration (for example, the gas concentration is higher than 25% of a lower explosive limit concentration), a plurality of user ignition failures in a short period of time, etc. (for example, three or more ignition failures within 1 min).

The gas terminal monitoring data may refer to various monitoring index data within a preset time period (for example, within last 3 minutes) from a current time. In some embodiments, the monitoring index data may include a gas concentration, a count of times for opening or closing the stove, a count of times for opening or closing the water heater valve, whether the ignition is successful, the fire power, or the like.

In some embodiments, the gas terminal monitoring data may be obtained from sensors of the smart gas object platform 150. The sensors may be installed at various positions in the gas system or indoor, such as in pipes, ceilings, etc. The sensors may be a plurality of sensors and may be configured to monitor a plurality of locations.

In some embodiments, the alarm information may be determined by the smart gas indoor safety management sub platform. For example, the smart gas indoor safety management sub platform may obtain gas concentration information based on a gas concentration sensor, and determine whether the gas concentration is higher than a preset concentration threshold (for example, the gas concentration is higher than 25% of a lower explosion concentration). In response to a determination that the gas concentration is higher than a preset concentration threshold, the smart gas indoor safety management sub platform may generate gas concentration alarm information and send the gas concentration alarm information to the smart gas service platform through the smart gas data center, and then send the gas concentration alarm information to the smart gas user platform 110.

In some embodiments, the supervision user sub platform of the smart gas user platform may send an instruction for obtaining the monitoring information to the smart gas service platform. The smart gas service platform may further send the instruction to the smart gas data center of the smart gas safety management platform. The smart gas data center may upload monitoring information stored in the smart gas data center to the supervision user sub platform through the smart gas service platform.

In some embodiments, the smart gas data center may obtain the monitoring information from the smart gas object platform through the smart gas sensor network platform and send the monitoring information to the smart gas indoor safety management sub platform for processing.

The user description information may refer to information for describing a condition of the gas system, which is input by the user. For example, the user description information may include the user-defined alarm information uploaded by the user, or the like.

The user-defined alarm information uploaded by the user may refer to information for describing a current abnormal situation of the gas system, which is input by the user. For example, the user-defined alarm information may include inability to ignite, insufficient fire power, or inability to adjust fire power.

In some embodiments, the user-defined alarm information may be input by the user through the user terminal based on text or form filling, and uploaded by the user to the smart gas user platform 110, then sent by the smart gas user platform 110 to the smart gas service platform 120 or the smart gas safety management platform 130.

In some embodiments, the user may upload the user description information to the smart gas service sub-platform of the smart gas service platform through the smart gas user sub platform of the smart gas user platform. The smart gas service sub platform may upload the user description information to the smart gas data center, and the smart gas data center may send the user description information to the smart gas indoor safety management sub platform for further processing.

In step 220, determining the cause of gas leakage based on the monitoring information and the user description information.

In some embodiments, the smart gas safety management platform 130 may determine the cause of gas leakage based on the monitoring information and user description information. In some embodiments, the cause of gas leakage may include loose connection at connections (e.g., hoses) between gas meters, stoves or water heaters, and failure of components in the gas meters. For example, if the gas system monitors an abnormal pressure value at the gas meter connection, the smart gas safety management platform 130 may determine that the cause of the gas leakage is the loose connection at the gas meter connection.

In some embodiments, the smart gas safety management platform 130 may input the monitoring information of the gas system and user description information into a gas leakage cause prediction model to obtain the cause of gas leakage. The gas leakage cause prediction model may be trained based on historical data of the gas system. For more information on the gas leakage prediction model, refer to the descriptions in FIG. 3 and FIG. 4 of the present disclosure.

In step 230, determining a target solution based on the cause of gas leakage.

The target solution may refer to a solution for solving a gas system failure. For example, if the smart gas safety management platform 130 determines that the cause of gas leakage is loose connection at gas meter connection, the smart gas safety management platform 130 may identify "replacing hose of gas meter" as the target solution. For example, if the smart gas safety management platform 130 determines that the cause of gas leakage is failure of the component in the gas meter, then the smart gas safety management platform 130 may identify "replacing the gas meter" or "maintaining the gas meter" as the target solution. For example, if the smart gas safety management platform 130 determines that the cause of gas leakage is gas pipeline corrosion, then the smart gas safety management platform 130 may identify "replacing gas pipeline" as the target solution.

In some embodiments, the smart gas indoor safety management sub platform of the smart gas safety management platform 130 may determine the target solution in a variety of ways, for example, the smart gas indoor safety management sub platform may determine the target solution based on a way of historical data statistics or model prediction. In some embodiments, the smart gas safety management platform 130 may count solutions for each cause of gas leakage in historical data and use the solution with a maximum time of use or a highest solution rate as the target solution.

In some embodiments, the smart gas indoor safety management sub platform may upload the cause of gas leakage and corresponding target solution to the smart gas data center, the smart gas data center may send the cause of gas leakage and corresponding target solution to the smart gas service platform, and the smart gas service platform may send the cause of gas leakage and corresponding target solution to the smart gas user platform to provide a view for the user.

In some embodiments, the smart gas safety management platform 130 may construct a historical feature vector based on historical data, construct a gas leakage cause vector based on the monitoring information of the gas system and the user description information, and determine the target solution according to a similarity between the historical feature vector and gas leakage cause vector (for example, a highest similarity may be considered as a highest effective solution rate).

The method of smart gas terminal linkage disposal provided by some embodiments of the present disclosure may automatically determine the cause of gas leakage and give corresponding target solution based on the monitoring information of the gas system and the user description information, which avoids low efficiency and great difficulty of manual troubleshooting and improves efficiency of solving a gas leakage problem.

It should be noted that the above description of process 200 is for illustrative purposes only and does not limit the scope of application of the present disclosure. For those skilled in this field, various modifications and changes may be made to process 200 under a guidance of the present disclosure. However, these amendments and changes are still within the scope of the present disclosure.

Figure 3:
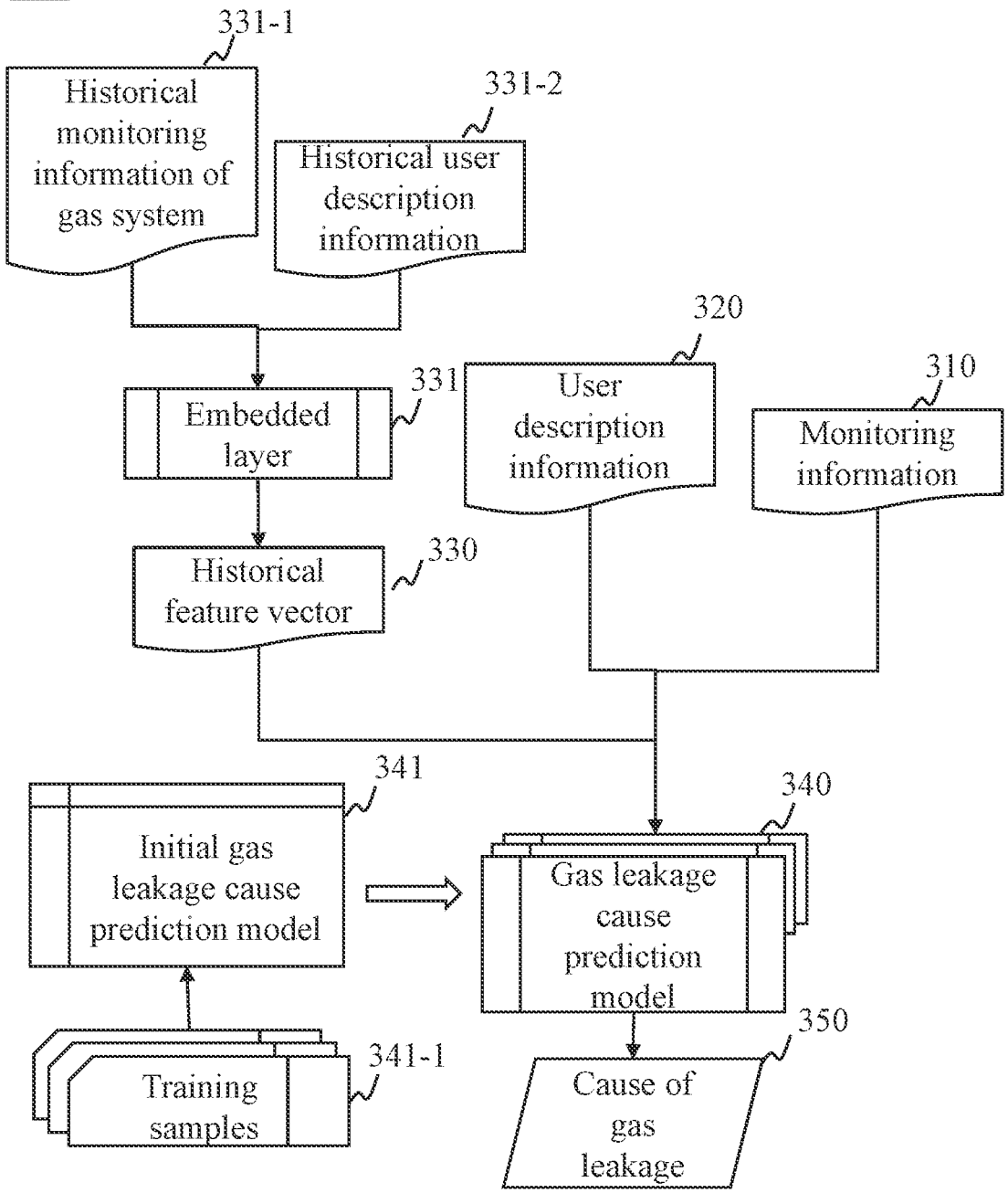
FIG. 3 is a schematic diagram of a gas leakage cause prediction model according to some embodiments of the present disclosure.

FIG. 3 is a schematic diagram of a gas leakage cause prediction model according to some embodiments of the present disclosure. As shown in FIG. 3, the method 300 for determining the cause of gas leakage by using the gas leakage cause prediction model may include following operations.

In some embodiments, the smart gas safety management platform 130 may determine the cause of gas leakage by the gas leakage cause prediction model based on the monitoring information of the gas system and user description information. The gas leakage cause prediction model may be a machine learning model.

The input of the gas leakage cause prediction model 340 may include the monitoring information 310 and user description information 320, and the output of the gas leakage cause prediction model 340 may include the cause of gas leakage 350. More relevant descriptions of the monitoring information of the gas system and the user description information may be found in step 210 of FIG. 2 and its corresponding description, and more relevant descriptions of the causes of gas leakage may be found in step 220 of FIG. 2 and its corresponding description.

In some embodiments, the input of the gas leakage cause prediction model may also include a historical feature vector 330.

The historical feature vector 330 may refer to data in a vector form generated from the historical data, which may reflect historical features of the gas system. The historical feature vector may take many forms, for example, a historical feature vector may be (H1, H2, H3), where H1 is historical alarm information, H2 is historical gas terminal monitoring data, and H3 is historical disposition information.

The historical data may refer to data reflecting the features of the gas system in a historical time period. The historical data may include historical monitoring information of the gas system 331-1 and historical user description information 331-2. The historical monitoring information of the gas system and the historical user description information may refer to the monitoring information and the user description information of the gas system in the historical time period respectively. A duration of the historical time period may be preset manually, such as a month. Relevant descriptions of the monitoring information of the gas system and the user description information may be found in FIG. 2 and its corresponding descriptions.

In some embodiments, the historical data may include historical monitoring information of the gas system and historical disposal information of the gas system. The historical monitoring information of the gas system may include historical alarm information of the gas system. The historical alarm information may refer to the alarm information of the gas system in the historical time period. For relevant description of the alarm information, refer to FIG. 2 and its corresponding description.

The historical disposal information of the gas system may refer to record information of operations of the user such as repairing or replacing parts and components of the gas system in the historical time period. For example, contents of the historical disposal information may be "replacing battery a month ago", "replacing cooker tube a week ago", "repairing ignition device two weeks ago".

In some embodiments of the present disclosure, the historical feature vectors may be determined by the historical data, so that the obtained historical feature vectors may better reflect the historical features of the gas system, thus determining cause of the current gas leakage more accurately by combining the historical features of the gas system.

In some embodiments, the historical feature vector 330 may be obtained from an embedded layer 331 based on the historical data. The embedded layer 331 may be a machine learning model, the input of the embedded layer 331 may include the historical monitoring information of the gas system 331-1 and the historical user description information 331-2, and the output of the embedded layer 331 may be the corresponding historical feature vector 330.

In some embodiments, the embedded layer 331 may be trained by a plurality of training samples with labels. For example, the plurality of training samples with labels may be input into an initial embedding layer, a loss function may be constructed based on the labels and results of the initial embedding layer, and parameters of the initial embedding layer may be iteratively updated based on the loss function. When the loss function of the initial embedded layer satisfies a preset condition, a model training may be completed and the trained embedded layer may be obtained. The preset conditions may be a convergence of the loss function, a count of iterations reaching a threshold, etc.

In some embodiments, the gas leakage cause prediction model 340 may be trained by a plurality of training samples with labels. For example, the plurality of training samples 341-1 with labels may be input into an initial gas leakage cause prediction model 341, and a loss function may be constructed based on the labels and outputs of the initial gas leakage cause prediction model 341. Parameters of the initial gas leakage cause prediction model 341 may be updated iteratively based on the loss function. When the loss function satisfies a preset condition, the model training may be completed, and a trained gas leakage cause prediction model 340 may be obtained.

In some embodiments, the training samples may come from the historical monitoring information of the gas system and historical user description information, and the labels may be determined by manual input.

In some embodiments of the present disclosure, the accuracy of the cause of gas leakage output by the gas leakage cause prediction model may be effectively improved by introducing the historical feature vectors as the inputs of the gas leakage cause prediction model.

Figure 4:
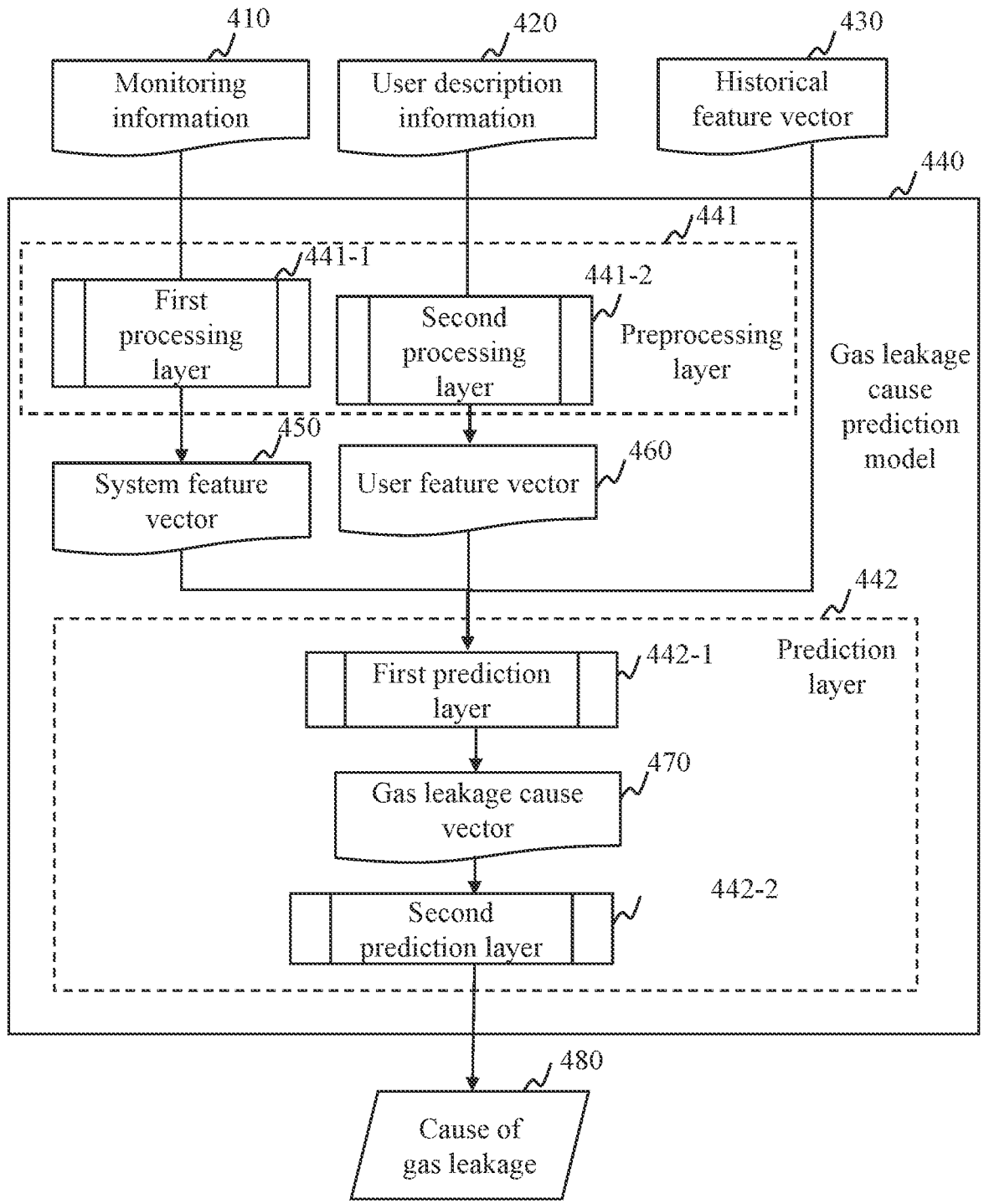
FIG. 4 is a structural diagram of a gas leakage cause prediction model according to some embodiments of the present disclosure.

FIG. 4 is a structural diagram of a gas leakage cause prediction model according to some embodiments of the present disclosure. As shown in FIG. 4, another method 400 for determining the cause of gas leakage through a gas leakage cause prediction model may include the following operations.

In some embodiments, the gas leakage cause prediction models may include a preprocessing layer 441 and a prediction layer 442.

The input of the preprocessing layer 441 may include the monitoring information 410 of the gas system and the user description information 420, and the output of the preprocessing layer 441 may include a system feature vector 450 and a user feature vector 460.

The preprocessing layer 441 may include a first processing layer 441-1 and a second processing layer 441-2. The first processing layer 441-1 and the second processing layer 441-2 may be machine learning models.

The first processing layer 441-1 may be configured to process the monitoring information 410 of the gas system to obtain the system feature vector 450. An input of the first processing layer 441-1 may be the monitoring information 410 of the gas system and an output of the first processing layer 441-1 may be the system feature vector 450.

The system feature vector 450 may refer to data in vector form generated based on the monitoring information 410 of the gas system, which may reflect features of the gas system. For example, a system feature vector may be (S1, S2, S3), where S1 denotes an obtaining time of the monitoring information, S2 denotes the alarm information, and S3 denotes the gas terminal monitoring data.

The second processing layer 441-2 may be configured to process the user description information 420 to obtain the user feature vector 460. An input of the second processing layer 441-2 may be the user description information 420 and an output of the second processing layer 441-2 may be the user feature vector 460.

The user feature vector 460 may refer to data in vector form generated based on the user description information 420, which may reflect the feature of the gas system. For example, a user feature vector may be (U1, U2), where U1 denotes an obtaining time of the user description information and U2 denotes the user description information.

The input of the prediction layer 442 may include a historical feature vector 430, the system feature vector 450, and the user feature vector 460, and an output of the prediction layer 442 may be the cause of gas leakage 480.

In some embodiments, the prediction layer 442 may include a first prediction layer 442-1 and a second prediction layer 442-2. The first prediction layer 442-1 and the second prediction layer 442-2 may be machine learning models.

The first prediction layer 442-1 may be configured to process the historical feature vector 430, the system feature vector 450 and the user feature vector 460 to obtain a gas leakage cause vector 470. The input of the first prediction layer 442-1 may include the historical feature vector 430, the system feature vector 450 and the user feature vector 460, and an output of the first prediction layer 442-1 may be the gas leakage cause vector 470.

A description of the historical feature vector 430 may be found in FIG. 3 and its related descriptions.

The gas leakage cause vector 470 may refer to data in vector form generated according to the historical feature vector 430, the system feature vector 450 and the user feature vector 460, which may reflect features of the cause of gas leakage. The gas leakage cause vectors may take many forms. For example, a gas leakage cause vector may be (R1, R2, R3, R4, R5), where R1 denotes time of gas leakage, R2 denotes a monitored gas concentration when gas leakage occurs, R3 denotes the alarm information, R4 denotes the user description information, and R5 denotes the cause of gas leakage.

The second prediction layer 442-2 may be configured to process the gas leakage cause vector 470 to obtain the cause of gas leakage 480. An input of the second prediction layer 442-2 may be the gas leakage cause vector 470, and an output of the second prediction layer 442-2 may be the cause of gas leakage 480.

In some embodiments, the input of the second prediction layer 442-2 may also include a probability of misreporting.

The misreporting may refer to situations where the monitoring information 410 of the gas system and/or the user description information 420 are inconsistent with an actual situation. For example, the gas system may have sufficient fire power, and due to a failure of the monitoring device, a content of the corresponding generated monitoring information of the gas system may be "small gas fire power", which may be judged as misreporting. The probability of misreporting may indicate a possibility of misreporting, and a value of the probability may be expressed as a percentage. For example, the probability of misreporting is 20%, which represents that a probability of the monitoring information 410 of the gas system and/or the user description information 420 not conforming to an actual situation may be 20%. The method for determining the probability of misreporting may be found in FIG. 5 and its corresponding description.

In some embodiments, a first processing module may include a supplementary data module. In response to a determination that the probability of misreporting is greater than a probability threshold, the smart gas safety management platform may supplement the monitoring data of the gas system by the supplementary data module, and determine a new system feature vector based on supplemented monitoring data of the gas system. Specifically, before determining the corresponding historical feature vector 330 based on the historical monitoring information of the gas system 331-1 and historical user description information 331-2 through the embedded layer 331, in response to the determination that the probability of misreporting is greater than a probability threshold, the smart gas safety management platform may supplement the historical monitoring information of the gas system 331-1 and/or the historical user description information 331-2. Data may be supplemented by expanding data types or quantities. The expanding data types may refer to increasing data types contained in the historical monitoring information of the gas system 331-1 and the historical user description information 331-2. For example, original data type contained in the historical monitoring information of gas system 331-1 and the historical user description information 331-2 may be numerical data (e.g., gas concentration), so the supplemented data type may be data in a form of image of gas fire power, etc. A value of a probability threshold may be preset manually.

The types and quantities of data to be supplemented in a data supplementation process may be determined based on preset rules. For example, a correspondence table between the probability of misreporting and the types and quantities of data to be supplemented, and the types and quantities of data to be supplemented may be determined based on the correspondence in the table. The types and quantities of data to be supplemented in the data supplementation process may also be determined based on a data supplement model. The data supplement model may be a machine learning model, and the input of the data supplement model may include the probability of misreporting, the historical monitoring information of the gas system 331-1 and the historical user description information 331-2, and output of the data supplement model may be the types and quantities of data to be supplemented.

In some embodiments, not all data needs to be monitored in real-time due to the need to conserve energy. For example, important data such as the gas concentration needs to be monitored in real-time, while other data (e.g., site picture of gas system) may not need to be monitored in the real-time, or may be monitored for a longer cycle time. In some embodiments of the present disclosure, when the probability of misreporting is greater than the probability threshold, data without the real-time monitoring may be obtained as supplementary data, which may achieve a purpose of correcting input data of the gas leakage cause prediction model and avoid serious deviation of the output of the model from reality.

In some embodiments of the present disclosure, by introducing the probability of misreporting, a purpose of avoiding the situation in which the obtained cause of gas leakage is wrong due to incorrect input data of the gas leakage prediction model may be achieved.

In some embodiments of the present disclosure, the prediction layer of the gas leakage cause prediction model may be further divided into two layers. The two layers may be used to process the monitoring information of the gas system and the user description information respectively to obtain the corresponding system feature vector and the user feature vector. A data form may be standardized for subsequent processing, which is helpful to improve the prediction accuracy of the gas leakage cause prediction model.

In some embodiments of the present disclosure, the gas leakage cause prediction model may be divided into a plurality of layers. First, the monitoring information of the gas system and the user description information may be processed by the preprocessing layer to obtain the system feature vector and user feature vector. Then, the system feature vector, user feature vector and historical feature vector may be processed by the prediction layer to obtain the cause of gas leakage, which is beneficial to improve the prediction accuracy of the gas leakage cause prediction model.

In some embodiments, an output of the preprocessing layer 441 of the gas leakage cause prediction model may be used as an input to the prediction layer 442, the preprocessing layer 441 and the prediction layer 442 may be obtained through joint training.

In some embodiments, sample data of the joint training may include the sample monitoring information of gas system, sample user description information, and a sample history feature vector, and labels are a sample system feature vector, a sample user feature vector, and a sample cause of gas leakage. The joint training process may include: inputting the sample monitoring information of the gas system and the sample user description information into the preprocessing layer 441 to obtain the system feature vector and user feature vector output by the preprocessing layer 441, using the system feature vector and user feature vector output by the preprocessing layer 441 as training sample data, and inputting the training sample data and the sample historical feature vector into the prediction layer 442 to obtain the cause of gas leakage output by the prediction layer 442. A loss function may be constructed based on the sample cause of gas leakage and the cause of gas leakage output by the prediction layer 442, and parameters of the preprocessing layer 441 and the prediction layer 442 may be updated simultaneously. By updating the parameters, the trained preprocessing layer 441 and the trained prediction layer 442 may be obtained.

In some embodiments of the present disclosure, the cause of gas leakage may be predicted through the gas leakage cause prediction model, which may not only accurately predict the cause of gas leakage, but also save manpower and time costs.

It should be noted that, in some embodiments of the present disclosure, objects with the same terminology but different numbers may be the same content. For example, the monitoring information 310 and monitoring information 410, the user description information 320 and user description information 420, the historical feature vector 330 and historical feature vector 430, and the gas leakage cause prediction model 340 and gas leakage cause prediction model 440 refer to same content respectively.

Figure 5:
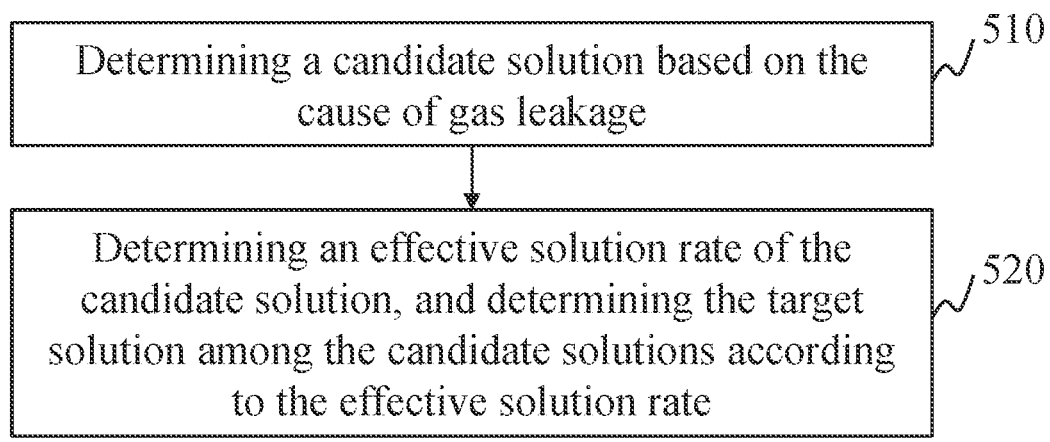
FIG. 5 is an exemplary flowchart of a method for determining a target solution according to some embodiments of the present disclosure.

FIG. 5 is an exemplary flowchart of a method for determining a target solution according to some embodiments of the present disclosure. As shown in FIG. 5, a process 500 may include following operations. In some embodiments, the process 500 may be executed by a smart gas safety management platform 130.

In step 510, determining a candidate solution based on the cause of gas leakage.

The candidate solutions may refer to one or more solutions corresponding to the cause of gas leakage. In some embodiments, a candidate solution may be one or more of following options: replacing a hose, replacing components of gas meter, replacing pipeline components, etc. For example, when the cause of gas leakage is rubber hose wear or rubber hose aging, the candidate solution may be replacing the rubber hose or replacing the rubber hose with a metal hose, etc.

In some embodiments, the smart gas safety management platform 130 may identify candidate solutions based on a variety of ways. For example, the smart gas safety management platform 130 may automatically determine the candidate solutions (e.g., selecting first N solutions in sorted results) through sorting a plurality of solutions corresponding to the cause of gas leakage (e.g., sorting based on historical solution success rates of solutions, etc.) using models or statistics.

In some embodiments, the smart gas safety management platform 130 may determine a candidate solution based on the feature vectors, the probability of misreporting, a similarity of vectors and a similarity of the reference vector in the database. The database may contain a plurality of reference vectors, each of the reference vectors may have a corresponding candidate solution.

The feature vector may be a vector constructed based on related information of a gas terminal in the gas system. The feature vector may be constructed in various of ways based on relevant information of the gas system. For example, a feature vector p may be constructed based on information of a gas terminal (x, y, m, n) in the gas system, where the information of the gas terminal (x, y, m, n) may indicate that the monitoring information of the gas terminal is x, the user description information is y, the probability of misreporting is m, and the cause of gas leakage is n. The cause of gas leakage may be determined based on the output of the first prediction layer in the gas leakage cause prediction model.

The reference vector may be constructed based on the historical monitoring information of the gas system, historical user description information and historical causes of gas leakage. A candidate solution corresponding to the reference vectors may be a solution corresponding to the cause of gas leakage. Vector to be matched may be constructed based on current monitoring information, current user description information and relevant information about the cause of the current gas leakage. The reference vector and the vector to be matched may be constructed using above method for constructing feature vectors.

In some embodiments, the smart gas safety management platform 230 may calculate distance between the reference vector and the vector to be matched respectively to determine the candidate solution for the causes of gas leakage corresponding to the vector to be matched. For example, a reference vector whose distance from the vector to be matched satisfies a preset condition may be taken as the target vector, and the solution of the cause of gas leakage corresponding to the target vector may be taken as a candidate solution of the gas leakage cause corresponding to the vector to be matched. The preset condition may be set according to situations. For example, the preset conditions may be that the vector distance is minimum or the vector distance is less than a distance threshold, etc.

In some embodiments, a misreporting probability determination model may be a machine learning model. For example, the misreporting probability determination model may be a convolution neural network model. An input of the misreporting probability determination model may include the system feature vector, the user feature vector, the historical feature vector, a user reliability (the user reliability is determined by historical misreporting frequency, user alarm frequency, etc.), and an output of the misreporting probability determination model may include the misreporting probability.

In some embodiments, the misreporting probability determination model may be obtained by training. For example, training samples are input into an initial misreporting probability determination model, a loss function is constructed based on labels and outputs of the initial misreporting probability determination model, and parameters of the initial misreporting probability determination model are updated. When a loss function of the initial misreporting probability determination model satisfies a preset condition, a model training may be completed. The preset condition may be convergence of the loss function, a count of iterations reaching a threshold, or the like.

In some embodiments, the training samples may be a plurality of historical causes of gas leakage and corresponding solutions, and the training samples may be obtained based on historical data. Labels of the training samples may be the monitoring information misreported by the gas system or the description information misreported by the user, etc. The labels may be marked manually.

The embodiments of the present disclosure determine a candidate solution based on vector similarity and the probability of misreporting, which takes full account of a reliability of user-reported information and improves an effectiveness of the candidate solution.

In step 520, determining an effective solution rate of the candidate solution, and determining the target solution among the candidate solutions according to the effective solution rate.

The effective solution rate may refer to a probability that the candidate solution effectively solves the cause of the gas leakage, for example, the effective solution rate may be 70%, 80%, etc.

In some embodiments, the effective solution rate may be determined based on historical data. For example, the smart gas safety management platform 130 may determine the effective solution rate of the candidate solution based on the cause of gas leakage and the corresponding candidate solutions, and whether the candidate solution solves the problem in the historical data.

In some embodiments, the effective solution rate may be determined based on an effective solution rate determination model.

The effective solution rate determination model may be a machine learning model. For example, the effective solution rate determination model may be a convolution neural network model. An input of the effective solution rate determination model may include the cause of gas leakage and candidate solutions, and an output of the effective solution rate determination model may include the effective solution rate.

In some embodiments, the effective resolution determination model may be obtained through training based on training samples with labels. For example, the training sample are input into an initial effective solution rate determination model, a loss function is constructed based on labels and outputs of the initial effective solution rate determination model, and parameters of the initial effective solution rate determination model are updated. The model training is completed when a loss function of the initial effective solution rate determination model satisfies a preset condition. The preset condition may be convergence of the loss function, a number of iterations reaching a threshold, or the like.

In some embodiments, the training samples may be a plurality of historical causes of gas leakage and corresponding candidate solutions, the training samples may be obtained based on historical data. Labels of the training samples may be probabilities that candidate solutions effectively solve the cause of the gas leakage, and the labels may be marked manually based on results of solutions to process the gas leakage.

The embodiments of the present disclosure may determine the effective solution rate of a candidate solution based on the effective solution rate determination model, make the determined effective solution rate more accurate, and further better identify the target solution from the candidate solutions.

The embodiments of the present disclosure may determine the effective resolution rate of a candidate solution through the effective resolution rate determination model, and determine a target solution from the candidate solutions based on the effective resolution rate, so as to make the target solution more effective and help the user obtain a better user experience.

In some embodiments, a device of smart gas terminal linkage disposal may be provided, including a processor for performing the method of smart gas terminal linkage disposal based on the Internet of Things in any of the embodiments of the present disclosure.

In some embodiments, a non-transitory computer-readable storage medium may be provided, which may store computer instructions, and when the computer reads the computer instructions, the computer may execute the method of smart gas terminal linkage disposal based on the Internet of Things in any of the embodiments of the present disclosure.

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about", "approximate" or "generally" in some examples. Unless otherwise stated, "approximately" or "generally" indicate that ±20% of change is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, the documents that limit the widest range of claims in the present disclosure (currently or later appended to the present disclosure) are also excluded. It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. A method for indoor gas leakage disposal of smart gas, wherein the method is implemented by a smart gas indoor safety management sub platform, including:
   obtaining monitoring information and user description information from a smart gas data center, wherein the monitoring information includes alarm information and gas terminal monitoring data, the monitoring information is obtained from a smart gas object platform through a smart gas sensor network platform by the smart gas data center, the user description information includes user-defined alarm information uploaded by a user, and the user description information is obtained from a smart gas user platform through a smart gas service platform by the smart gas data center;
   determining a cause of gas leakage based on the monitoring information and the user description information;

determining a plurality of candidate solutions based on the cause of gas leakage, including:
  determining a feature vector based on the monitoring information, the user description information, a probability of misreporting, and the cause of gas leakage, wherein the probability of misreporting is determined based on a misreporting probability determination model, and the misreporting probability determination model is a machine learning model; and
  determining the plurality of candidate solutions based on a similarity between the feature vector and a reference vector in a database, wherein the database includes a plurality of the reference vectors and candidate solutions corresponding to the plurality of reference vectors; and
determining an effective solution rate of the candidate solutions, and determining a target solution among the candidate solutions according to the effective solution rate.

2. The method for indoor gas leakage disposal of smart gas of claim 1, further including:
  the smart gas indoor safety management sub platform uploading the cause of gas leakage and the target solution to the smart gas data center;
  the smart gas data center sending the cause of gas leakage and the target solution to the smart gas service platform; and
  the smart gas service platform sending the cause of gas leakage and the target solution to the smart gas user platform.

3. The method for indoor gas leakage disposal of smart gas of claim 1, wherein the determining a cause of gas leakage based on the monitoring information and the user description information includes:
  determining the cause of gas leakage by a gas leakage cause prediction model, wherein an input of the gas leakage cause prediction model includes the monitoring information and the user description information, and an output of the gas leakage cause prediction model includes the cause of gas leakage.

4. The method for indoor gas leakage disposal of smart gas of claim 3, wherein the input of the gas leakage cause prediction model also includes a historical feature vector; and
  the historical feature vector is obtained based on historical data through an embedded layer.

5. The method for indoor gas leakage disposal of smart gas of claim 4, wherein the historical data includes historical monitoring information of a gas system and historical disposal information of the gas system, and the historical monitoring information includes historical alarm information of the gas system.

6. The method for indoor gas leakage disposal of smart gas of claim 3, wherein the gas leakage cause prediction model includes a preprocessing layer and a prediction layer, and the preprocessing layer includes a first processing layer and a second processing layer;
  the first processing layer is configured to process the monitoring information to obtain a system feature vector; and
  the second processing layer is configured to process the user description information to obtain a user feature vector.

7. The method for indoor gas leakage disposal of smart gas of claim 6, wherein the prediction layer includes a first prediction layer and a second prediction layer;
  an input of the first prediction layer includes the system feature vector, the user feature vector and the historical feature vector, and an output of the first prediction layer includes a gas leakage cause vector; and
  an input of the second prediction layer includes the gas leakage cause vector, and an output of the second prediction layer includes the cause of gas leakage.

8. The method for indoor gas leakage disposal of smart gas of claim 7, wherein the input of the second prediction layer includes the probability of misreporting.

9. The method for indoor gas leakage disposal of smart gas of claim 8, further comprising:
  in response to a determination that the probability of misreporting is greater than a probability threshold, supplementing system monitoring data, wherein the supplementing system monitoring data includes supplementing types and quantities of the system monitoring data; and
  updating the system feature vector based on supplemented system monitoring data.

10. The method for indoor gas leakage disposal of smart gas of claim 1, wherein an input of the misreporting probability determination model includes a system feature vector, a user feature vector, a historical feature vector, and a user reliability, and an output of the misreporting probability determination model includes the probability of misreporting; and the user reliability is determined by historical misreporting frequency and user alarm frequency.

11. The method for indoor gas leakage disposal of smart gas of claim 1, wherein the determining an effective solution rate of the candidate solutions includes:
  processing the cause of gas leakage and the candidate solutions based on an effective solution rate determination model to determine the effective solution rate, wherein the effective solution rate determination model is a machine learning model.

12. The Internet of Things system for indoor gas leakage disposal of smart gas of claim 10, wherein the smart gas indoor safety management sub platform is further configured to:
  in response to a determination that the probability of misreporting is greater than a probability threshold, supplement system monitoring data, wherein the supplementing system monitoring data includes supplementing types and quantities of the system monitoring data; and
  update the system feature vector based on supplemented system monitoring data.

13. A non-transitory computer-readable storage medium storing computer instructions, when the computer reads the computer instructions in the storage medium, the computer executes the method for indoor gas leakage disposal of smart gas of claim 1.

14. An Internet of Things system for indoor gas leakage disposal of smart gas, wherein the Internet of Things system includes a smart gas user platform, a smart gas service platform, a smart gas safety management platform, a smart gas sensor network platform, and a smart gas object platform, the smart gas safety management platform includes a smart gas indoor safety management sub platform and a smart gas data center, the smart gas indoor safety management sub platform is configured to perform operations including:
  obtaining monitoring information and user description information from a smart gas data center, wherein the monitoring information includes alarm information and gas terminal monitoring data, the monitoring information is obtained from a smart gas object platform through a smart gas sensor network platform by the smart gas data center, the user description information includes user-defined alarm information uploaded by a user, and the user description information is obtained from a smart gas user platform through a smart gas service platform by the smart gas data center;

determining a cause of gas leakage based on the monitoring information and the user description information;

determining a plurality of candidate solutions based on the cause of gas leakage, including:

determining a feature vector based on the monitoring information, the user description information, a probability of misreporting, and the cause of gas leakage, wherein the probability of misreporting is determined based on a misreporting probability determination model, and the misreporting probability determination model is a machine learning model; and determining the plurality of candidate solutions based on a similarity between the feature vector and a reference vector in a database, wherein the database includes a plurality of the reference vectors and candidate solutions corresponding to the plurality of reference vectors; and determining an effective solution rate of the candidate solutions, and determining a target solution among the candidate solutions according to the effective solution rate.

15. The Internet of Things system for indoor gas leakage disposal of smart gas of claim 14, wherein the smart gas indoor safety management sub platform is configured to upload the cause of gas leakage and the target solution to the smart gas data center;

the smart gas data center is configured to send the cause of gas leakage and the target solution to the smart gas service platform; and the smart gas service platform is configured to send the cause of gas leakage and the target solution to the smart gas user platform.

16. The Internet of Things system for indoor gas leakage disposal of smart gas of claim 14, wherein the smart gas indoor safety management sub platform is further configured to:

determine the cause of gas leakage by a gas leakage cause prediction model, wherein an input of the gas leakage cause prediction model includes the monitoring information and the user description information, and an output of the gas leakage cause prediction model includes the cause of gas leakage.

17. The Internet of Things system for indoor gas leakage disposal of smart gas of claim 16, wherein the input of the gas leakage cause prediction model also includes a historical feature vector; and the historical feature vector is obtained based on historical data through an embedded layer.

18. The Internet of Things system for indoor gas leakage disposal of smart gas of claim 17, wherein the historical data includes historical monitoring information of a gas system and historical disposal information of the gas system, and the historical monitoring information includes historical alarm information of the gas system.

19. The Internet of Things system for indoor gas leakage disposal of smart gas of claim 16, wherein the gas leakage cause prediction model includes a preprocessing layer and a prediction layer, and the preprocessing layer includes a first processing layer and a second processing layer;

the first processing layer is configured to process the monitoring information to obtain a system feature vector; and the second processing layer is configured to process the user description information to obtain a user feature vector.

20. The Internet of Things system for indoor gas leakage disposal of smart gas of claim 19, wherein the prediction layer includes a first prediction layer and a second prediction layer;

an input of the first prediction layer includes the system feature vector, the user feature vector and the historical feature vector, and an output of the first prediction layer includes a gas leakage cause vector; and an input of the second prediction layer includes the gas leakage cause vector, and an output of the second prediction layer includes the cause of gas leakage.

* * * * *